United States Patent
Al-Wasis (10) Patent No.: US 8,823,201 B1
(45) Date of Patent: Sep. 2, 2014

(54) HORIZONTAL DUCTED WIND TURBINE

(71) Applicant: Adel A. Al-Wasis, Al-Sabahiya (KW)

(72) Inventor: Adel A. Al-Wasis, Al-Sabahiya (KW)

( * ) Notice: Subject to any disclaimer, the term of this patent is extended or adjusted under 35 U.S.C. 154(b) by 0 days.

(21) Appl. No.: 14/183,170

(22) Filed: Feb. 18, 2014

(51) Int. Cl.
| F03D 9/00 | (2006.01) |
| H02P 9/04 | (2006.01) |
| F03D 3/04 | (2006.01) |
| F03D 3/00 | (2006.01) |

(52) U.S. Cl.
CPC .............. F03D 3/0427 (2013.01); F03D 3/002 (2013.01); F03D 9/002 (2013.01)
USPC .......................................................... 290/55

(58) Field of Classification Search
CPC ........ F03D 3/0427; F03D 9/002; F03D 3/002
USPC ......................................... 290/55, 54, 44, 43
See application file for complete search history.

(56) References Cited

U.S. PATENT DOCUMENTS

| 4,012,163 | A | * | 3/1977 | Baumgartner et al. .... 415/208.3 |
| 5,009,569 | A | | 4/1991 | Hector, Sr. et al. |
| 6,981,839 | B2 | | 1/2006 | Fan |
| 7,215,037 | B2 | | 5/2007 | Scalzi |
| 8,556,571 | B2 | * | 10/2013 | Cassidy ......................... 415/4.3 |
| 2008/0317582 | A1 | * | 12/2008 | Cassidy ......................... 415/4.2 |
| 2009/0102197 | A1 | | 4/2009 | Fernandez |
| 2010/0129219 | A1 | | 5/2010 | Grewal |
| 2010/0329841 | A1 | | 12/2010 | O'Neil |
| 2011/0070067 | A1 | | 3/2011 | Caldwell |
| 2011/0189006 | A1 | | 8/2011 | Churchill et al. |
| 2012/0171011 | A1 | | 7/2012 | Iwanow |
| 2013/0069369 | A1 | | 3/2013 | Salehpoor |
| 2013/0119661 | A1 | | 5/2013 | Pringle et al. |

FOREIGN PATENT DOCUMENTS

RO            126688 A2     9/2011

* cited by examiner

*Primary Examiner* — Javaid Nasri
(74) *Attorney, Agent, or Firm* — Richard C Litman (57) ABSTRACT

The horizontal ducted wind turbine includes a power generator assembly adapted to be rotatably mounted to an elongate pole. At least one wind funnel assembly extends from one side of the power generator assembly. The wind funnel assembly includes an elongate funnel with a relatively large inlet at one end and a relatively small outlet at the opposite end in communication with a housing of the power generator assembly. A turbine is rotatably mounted inside the housing and a pair of generators is disposed on opposite ends of the turbine. The funnel passively compresses incoming wind to maximize wind velocity acting on the turbine to rotate the same causing the generator to produce energy. The wind funnel assembly can be provided with wings that facilitate stabilized positioning and self-orienting in response to changes in wind direction.

17 Claims, 8 Drawing Sheets

HORIZONTAL DUCTED WIND TURBINE

BACKGROUND OF THE INVENTION

1. Field of the Invention

The present invention relates to alternative energy systems, and particularly to a horizontal ducted wind turbine with features for maximizing power generation.

2. Description of the Related Art

Currently, alternative energy has become a major focus worldwide. The conventional energy systems that use sources such as fossil fuel, coal, and nuclear power produce much, if not most, of the energy consumed on a daily basis. However, the conventional systems also produce wastes that can be harmful to the environment if active steps have not been taken to regulate or check handling and disposal of the same. Moreover, the world does not contain an infinite supply of fuels such as fossil fuel and coal. At the rate of current consumption, this diminishing supply may not be able to meet future demands. As for nuclear power, much expense must be expended to construct the fuel rods, and when spent, the disposal thereof requires careful handling and disposal in special sites built to contain the radiation from residual radioactive materials that can last for centuries.

Due to the above concerns, many steps have been taken to find viable alternative energy systems. Some solutions to date include solar power, hydroelectric power, geothermal power, and wind power. All of these systems have their own advantages and disadvantages. One example of a common alternative energy solution includes solar energy. Solar energy converts heat from the sun into useable energy, such as electricity, via solar panels. Some areas of the world, such as the Middle East, typically have ideal locations and conditions for maximal sun exposure. However, the solar panels typically used in solar power energy systems can be relatively expensive for relatively low efficient energy conversion, though improvements in efficiency are continuously being made. Moreover, the costs for space and maintenance of such solar panels can be relatively expensive, diminishing the potential profits that can be gained thereby.

Similarly, wind power systems are also a relatively common solution for alternative energy. A typical wind power system utilizes a modern windmill-type design, which includes a propeller rotatably mounted to a single power generator pod. The power generator is usually mounted on top of an elongate pole and rotatable thereon. For maximal power generation, these types of wind power systems usually require locales where wind activity is prevalent with enough space for installation of a plurality of such power generator pods and the poles thereof. While sufficient, a single generator necessarily limits the amount of power that can be generated from the wind blowing past the propellers. Moreover, the propellers must also be designed to be aerodynamically efficient so that minimal wind force rotates the same. Such considerations and designs ultimately increase costs, and due to the nature of these types of systems, relatively large tracts of land typically would be required to produce energy for consumption by a given population.

Another type of wind power system typically includes a box-like structure that forms an interior tunnel or funnel directing incoming wind towards a rotatable fan connected to a generator. Such systems tend to be bulky and not aerodynamic, which decreases efficient utilization of the incoming wind.

Thus, a horizontal ducted wind turbine addressing the aforementioned problems is desired.

SUMMARY OF THE INVENTION

The horizontal ducted wind turbine includes a power generator assembly rotatably mounted to an elongate pole. At least one wind funnel assembly extends from one side of the power generator assembly. The wind funnel assembly includes an elongate funnel with a relatively large inlet at one end and a relatively small outlet at the opposite end in communication with a housing of the power generator assembly. A turbine is rotatably mounted inside the housing and a pair of generators is disposed on opposite ends of the turbine. The funnel passively compresses incoming wind to maximize wind velocity acting on the turbine to rotate the same causing the generator to produce energy. The wind funnel assembly can be provided with wings that facilitate stabilized positioning and self-orienting in response to changes in wind direction.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
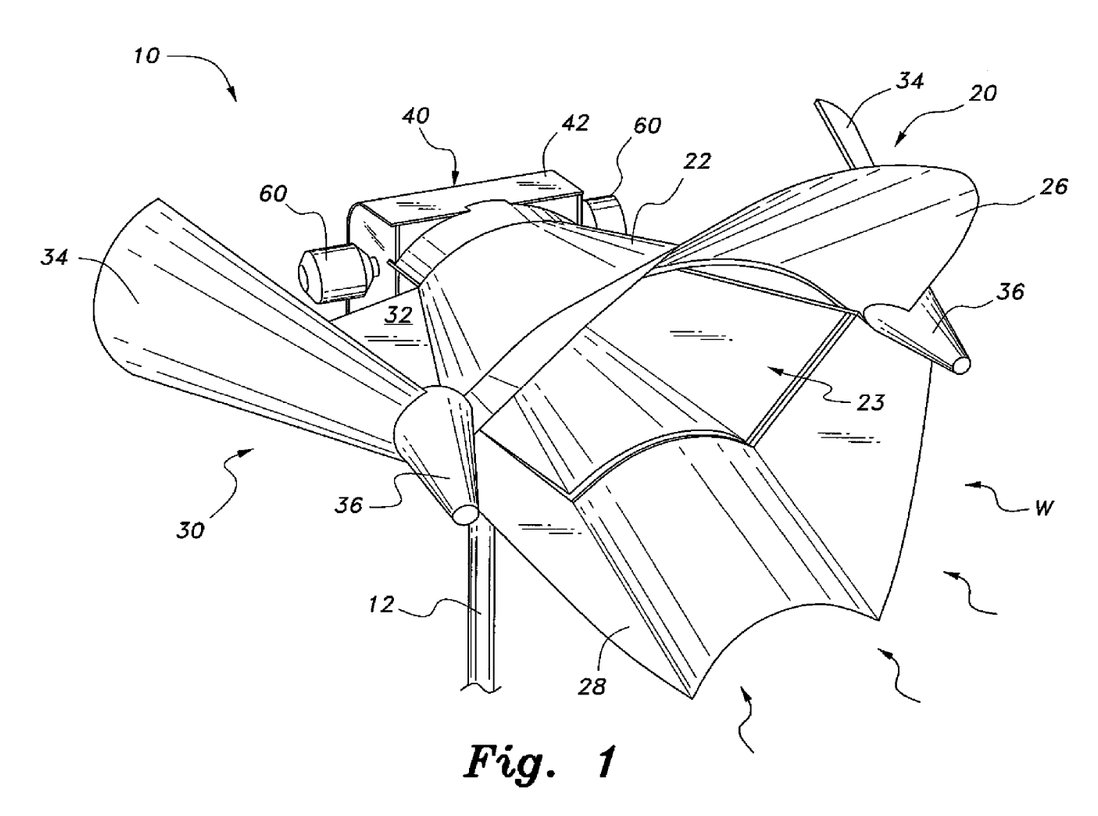
FIG. 1 is an environmental, perspective view of an embodiment of a horizontal ducted wind turbine according to the present invention.
Figure 2:
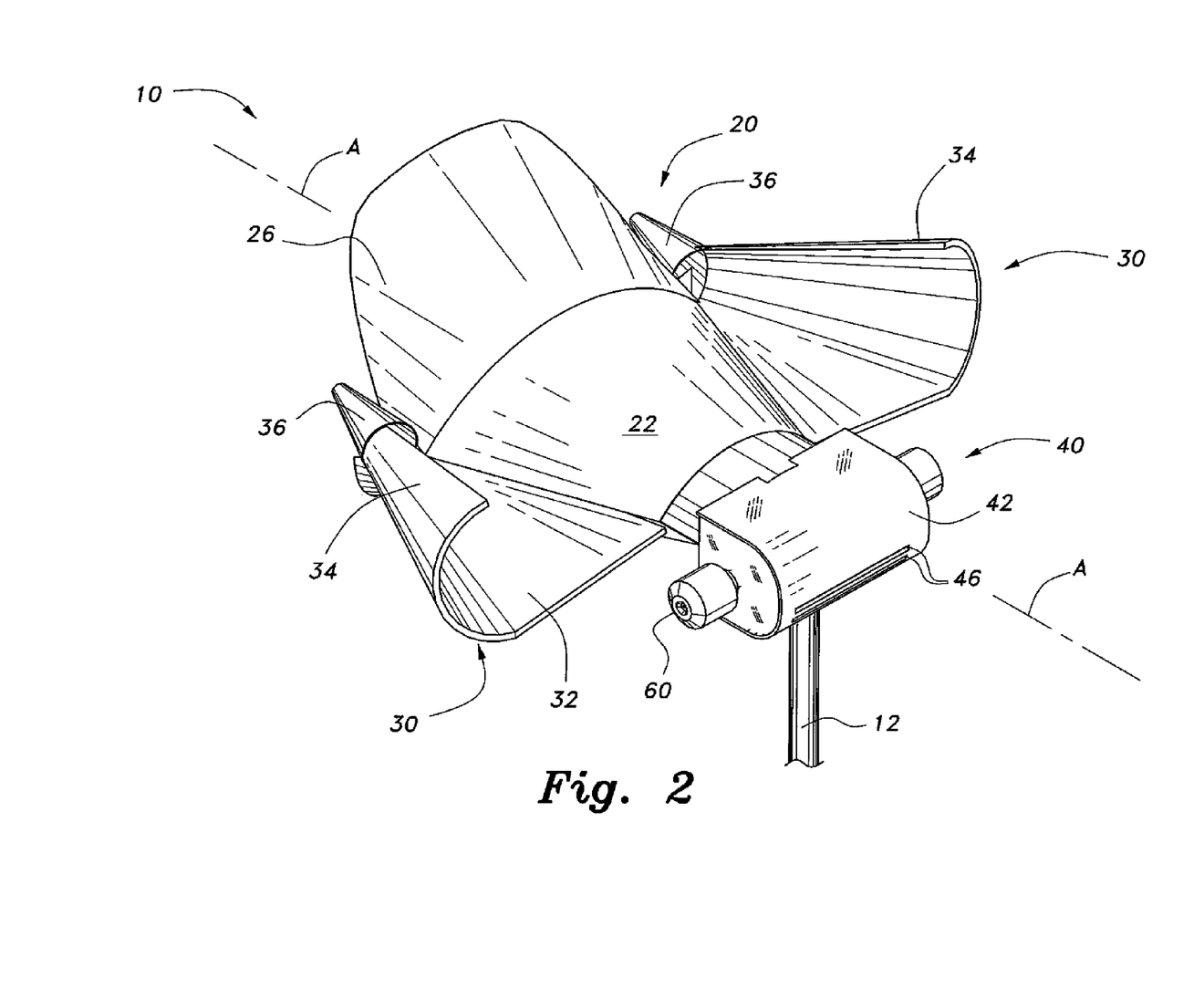
FIG. 2 is a rear perspective view of the horizontal ducted wind turbine shown in FIG. 1.
Figure 3:
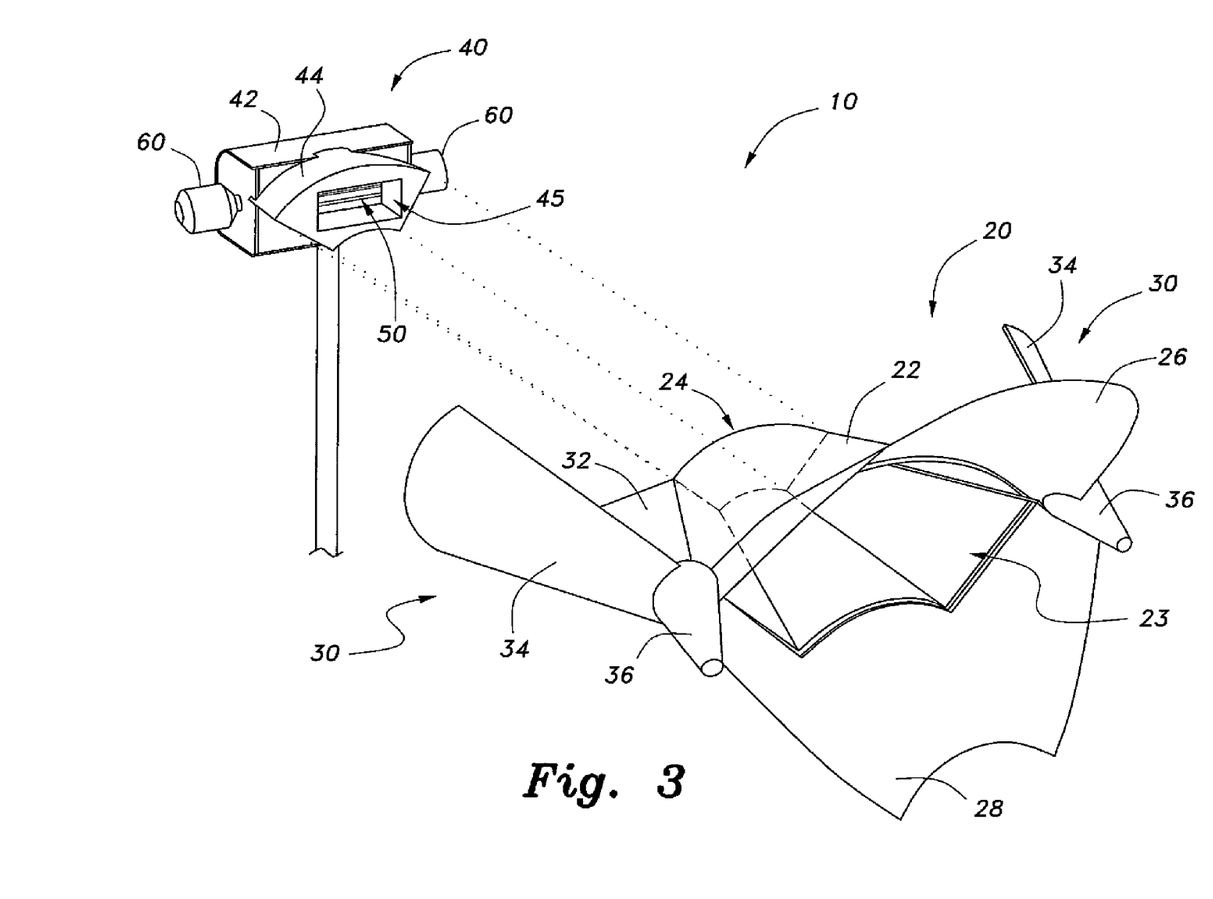
FIG. 3 is a partial exploded view of the horizontal ducted wind turbine shown in FIG. 1.

The horizontal ducted wind turbine, a first embodiment of which is designated by the reference number 10, provides efficient generation of power with maximal conversion of wind power. As shown in FIGS. 1-3, the horizontal ducted wind turbine 10 includes a wind funnel assembly 20 detachably mounted to a power generator assembly 40. The wind funnel assembly 20 passively compresses incoming wind as the wind passes through so that the exit velocity of the wind is relatively high prior to entering the power generator assembly 40. The relatively high velocity of the exiting wind turns a turbine 50 in the power generator assembly 40 in order to convert the same into useable energy such as electricity. The synergy between compressed wind flow and the effect thereof on the power generator assembly 40 maximizes use of the potential energy contained in the incoming wind at any given entering velocity, which can result in a more efficient wind power generation system.

Referring back to FIGS. 1-3, the wind funnel assembly 20 includes an elongate funnel or conduit 22 coupled to a housing 42 on the power generator assembly 40. As described herein and as indicated from the figures, the housing 42 can include a front, a back, opposing sides, a bottom and a generally hollow interior, for example. The funnel 22 is curvilinear and desirably shaped as a hollow, substantially arcuate segment of an annular frustocone. This shape provides a relatively narrow cross sectional profile that is more aerodynamic than a box-like structure. Moreover, the shape can prevent much of the abrupt, undesirable yaw that can occur during instances of sudden shear winds which can disrupt inflow of wind through the funnel 22. Though relatively narrow, the shape permits maximal capture of incoming wind W. As such, the funnel 22 presents a relatively large and wide inlet or inlet opening 23 at one end tapering down towards a relatively small and narrow outlet or outlet opening 24 at the opposite end. This construction forces the wind W entering through the inlet 23 at a given velocity to passively and progressively compress as the wind W flows towards the outlet 24. Thus, the exit velocity of the wind W at the outlet 24 is substantially higher than the entering given velocity, which assists in maximizing the wind force that can be applied to the power generator assembly 40. It is to be understood that the funnel 22 can be constructed with different low or narrow profile shapes that perform in a similar manner without departing from the scope of the invention.

In order to maximize capture of incoming wind W, the wind funnel assembly 20 includes an upper scoop 26 and a lower scoop 28. The upper scoop 26 is a panel desirably shaped as a curved duck bill that extends outwardly at a first divergent angle from the curved top of the inlet 23. The upper scoop 26 provides an obstruction that directs incoming wind W towards the inlet 23. The lower scoop 28 is a panel desirably shaped as a notched, curvilinear duck bill in contrast with the upper scoop 26 and also extends outwardly at a second divergent angle from the curved lower portion of the inlet 23, the first divergent angle being substantially the same or different from the second divergent angle. The lower scoop 28, however, functions similarly in that the lower scoop 28 directs incoming wind W towards the inlet 23. The upper and lower scoops 26, 28 enhance the performance of the wind funnel assembly 20 by assisting in capturing as much of the incoming wind W as possible to be directed towards the power generator assembly 40 during operation.

Wind conditions and direction do not tend to remain constant during operation. In order to compensate for changes in wind direction so as to orient and face the inlet 23 towards the incoming wind W, the horizontal ducted wind turbine 10 provides various features to facilitate automatic or self-reorientation. In an embodiment, the power generator assembly 40 is desirably mounted to a pole or bar 12 in a freely rotatable manner. This permits the mounted wind funnel assembly 20 to rotate thereon towards the wind W in reaction to cross winds or other types of changes in wind direction. The reaction is facilitated by a pair of wings or air foils 30 extending from the sides of funnel 22. In an embodiment, each wing 30 is desirably shaped as a curvilinear, substantially partial cone constructed in a swept wing configuration extending from the inlet 23 towards the outlet 24. The curvilinear, substantially partial cone shape includes a substantially triangular planar section 32 extending from one of the sides of the funnel 22 and a substantially partial cone section 34 contiguous with the substantially triangular planar section 32. The wings 30 can reduce drag and assist in stabilizing the wind funnel assembly 20 within a wind stream. Moreover, each wing 30 includes a conical wing tip 36 provided at a juncture between the inlet 23 and the corresponding wing 30. Each conical wing tip 36 can be constructed as a hollow cone, a hollow cone with a closed tip, a solid cone, or any combination thereof. In an embodiment, each conical wing tip 36 is desirably disposed at a non-parallel angle with respect to the imaginary longitudinal line or axis A of the elongate funnel 22. In other words, each conical wing tip 36 extends at a divergent angle with respect to the imaginary longitudinal axis A. The conical wing tips 36 present an obstruction that can be acted on by the wind W during directional changes thereof to create a turbulent zone directing the wind back towards the substantially partial cone section 34 to thereby assist in steering the funnel 22 towards facing the wind W at the new direction. Additionally, the substantially partial cone section 34 provides a relatively large, outer-facing surface area that also assists in steering the funnel 22 whenever the changing wind flows across, rather than along, the substantially partial cone section 34.

It is contemplated that the funnel assembly 20 can be provided with wings 30 of various sizes and shapes apart from those already described without departing from the scope of the invention. For example, the wings 30 can be provided with more straight line, angular sections instead of the curvilinear configuration shown in the drawings, so long as they can perform similar stabilizing and steering functions. Moreover, the wing tips 36 can be attached to the corresponding substantially partial cone section 34 so that each wing tip 36 can freely move thereon, e.g., a swivel connection. Such a connection can permit each wing tip 36 to move within a limited conical field in response to changes in wind direction as a further enhancement to initiating reorientation of the funnel assembly 20.

Figure 4:
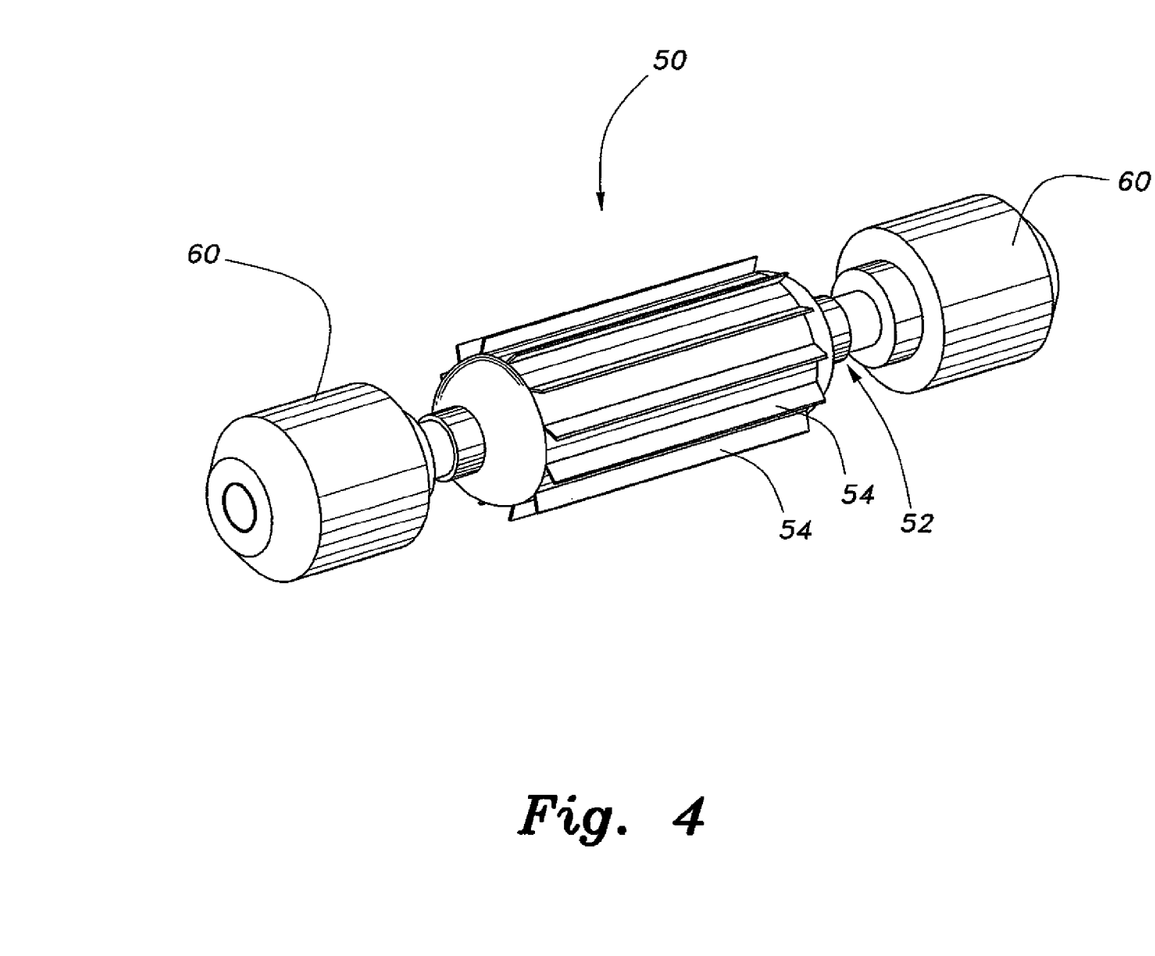
FIG. 4 is a perspective of a power generator assembly for embodiments of a horizontal ducted wind turbine according to the present invention.

As best shown in FIGS. 2-4, the power is generated by the power generator assembly 40. The power generator assembly 40 includes the housing 42 and a mounting boss 44 extending outwardly from the front of the housing 42. The housing 42 houses a turbine 50 therein. The mounting boss 44 is desirably the same shape as that of the outlet 24 on the funnel 22 so as to provide a substantially tight fit for mounting the funnel 22 thereon. Though not shown, the funnel 22 can be fixed to the mounting boss 44 by any conventional means such as fasteners, welds, adhesive bonding, latches, interference-fit connections, snap-fit connectors, and the like. The mounting boss 44 includes an opening 45 communicating with the generally hollow interior of the housing 42 thereby exposing the turbine 50 to forces from the incoming wind W.

The turbine 50 is rotatably mounted inside the housing 42. The turbine 50 includes an elongate, substantially cylindrical shaft 52 and a plurality of fins, fans, or blades 54 radiating from the surface of the shaft 52. Each opposite end of the shaft 52 is connected to a respective generator 60. When assembled, the generators 60 extend from opposing sides of the housing 42. In use, the force of the wind W entering the housing 42 through the opening 45 acts against the blades 54 to rotate the turbine 50. Due to their connection to the shaft 52, the generators 60 convert the rotation of the turbine 50 into energy, such as electricity. Though not shown, the power generator assembly 40 includes wires and the like to facilitate energy transmission as is known to those skilled in the art. Unlike most conventional wind turbines, the pair of generators 60 can facilitate increased power production from the same turbine compared to systems with a single generator of similar, given capacity.

After the wind W flows over the blades 54, the wind W is allowed to escape through vents 46 formed at the back of the housing 42. The vents 46 are desirably disposed on at least the lower half section of the back of the housing 42 in order to direct the escaping wind W towards the ground. By this construction, the upper half section of the back of the housing 42 forms a deflector screen inside the housing 42 that forces the wind W to flow in a relatively wide arc around turbine 50, which ensures rotation of turbine 50 occurs consistently and efficiently because wind forces act at an optimum attack angle on the blades 54 for longer duration. Moreover, the deflector screen function creates high and low pressure zones to direct wind flow in the desired direction. It is contemplated that the vents 46 can be formed so that they align with the opening 45. However, this can result in insufficient pressure differential zones inside the housing 42 that can affect rotation of the turbine 50 unless the turbine 50 is positioned such that only a portion of the turbine 50 is exposed to the wind flow. Furthermore, the lower position of the vents 46 can assist in maintaining the fulcrum about the pole 12 to assist in easing repositioning of the funnel 22 during changing wind directions.

Another embodiment of a horizontal ducted wind turbine 100 is shown in FIGS. 5A, 5B, 6 and 7. In this embodiment, the horizontal ducted wind turbine 100 includes a pair of wind funnel assemblies 120a, 120b in a substantially balanced, mirrored alignment with each other and connected to a power generator assembly 140 disposed between the pair of wind funnel assemblies 120a, 120b. The horizontal ducted wind turbine 100 is also capable of self-adjustment to changes in wind direction except without the need of the previously described wings 30. It is to be understood that the horizontal ducted wind turbine 100 includes many features similar to the previously described horizontal ducted wind turbine 10.

Figure 5A:
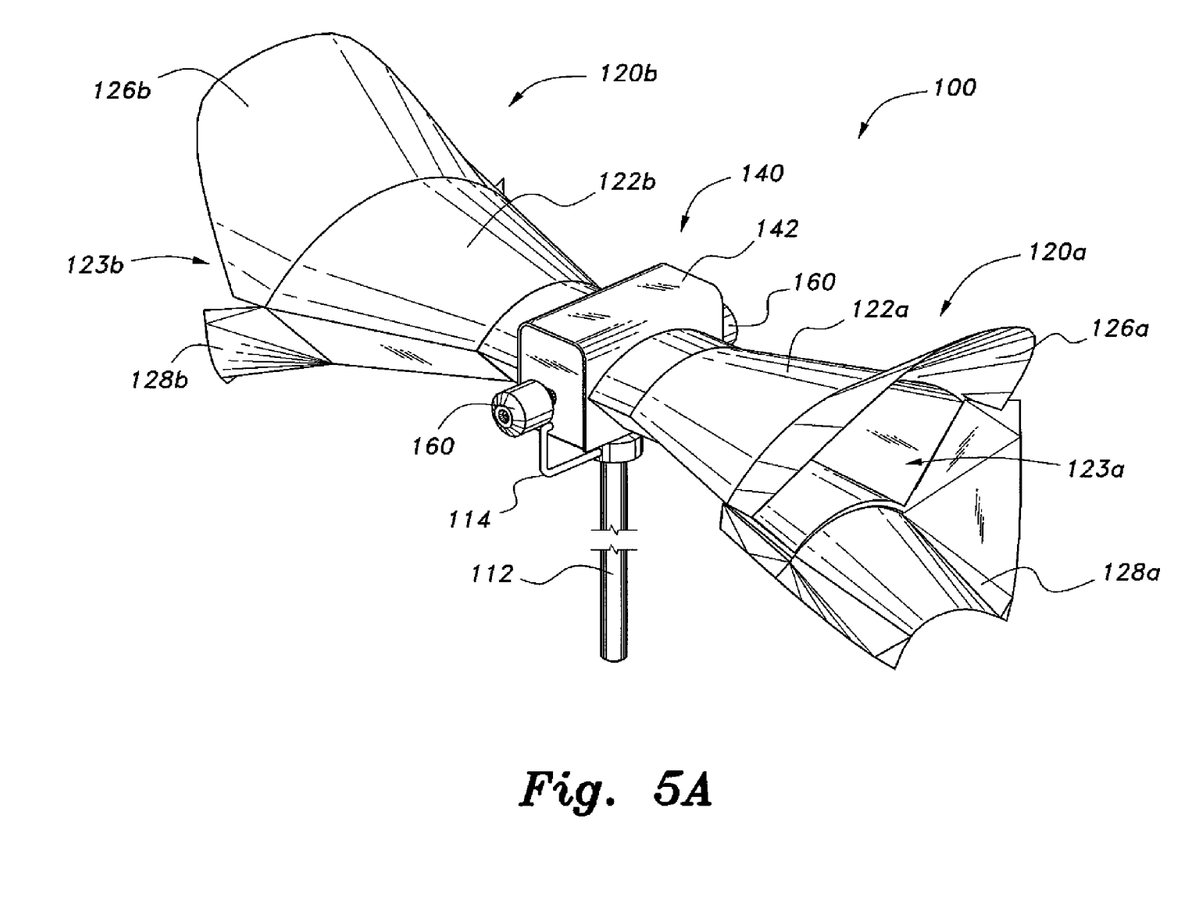
FIG. 5A is a perspective view of another embodiment of a horizontal ducted wind turbine according to the present invention.
Figure 5B:
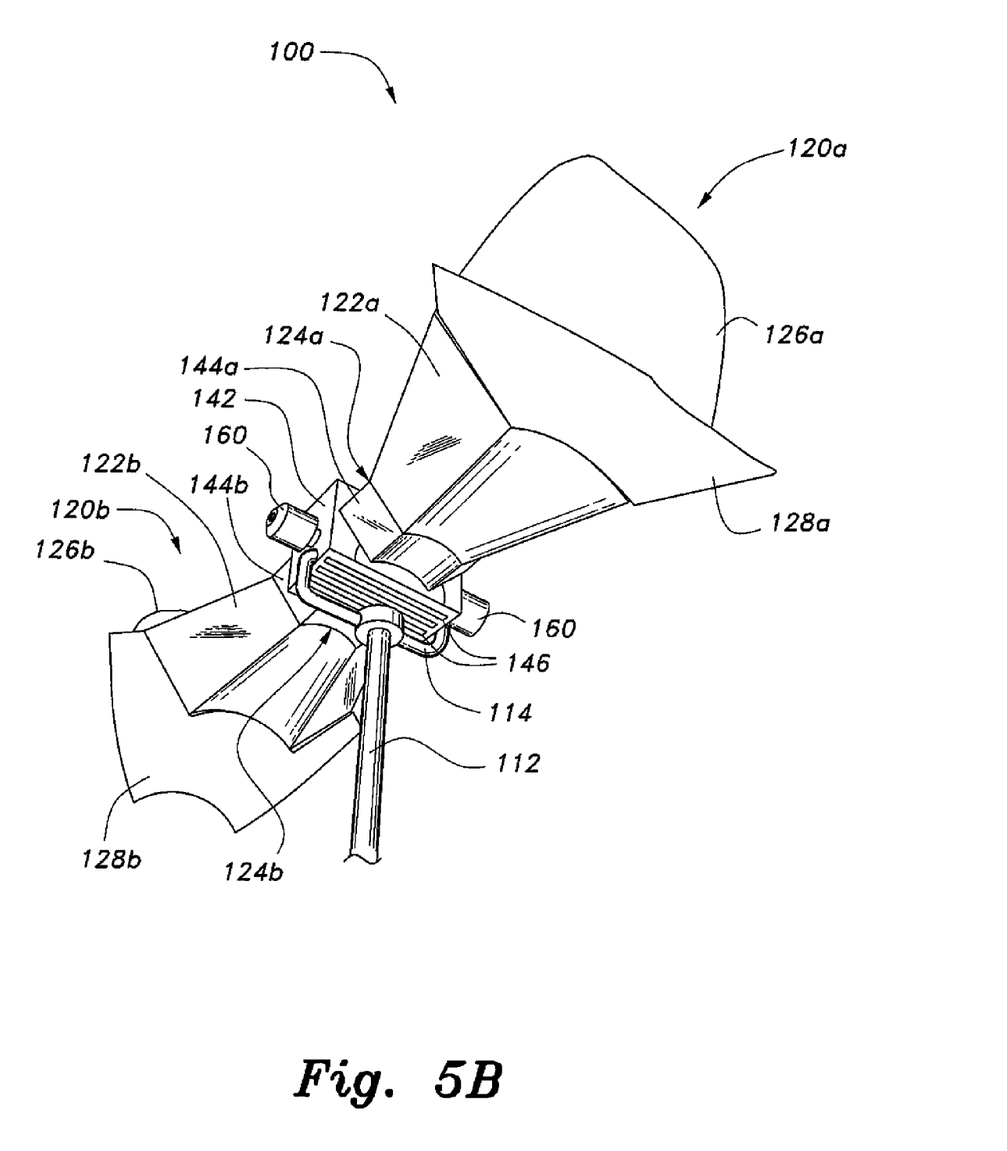
FIG. 5B is a bottom perspective view of the horizontal ducted wind turbine shown in FIG. 5A.

As shown, the horizontal ducted wind turbine 100 includes a power generator assembly 140 and a pair of wind funnel assemblies 120a, 120b extending from opposite sides of a housing 142 via respective mounting bosses 144a, 144b. Similar to the housing 42, as described herein and as indicated from the figures, the housing 142 can include a front, a back, opposing sides, a bottom and a generally hollow interior, for example. The wind funnel assemblies 120a, 120b are aligned with each other to substantially balance the overall construction with the respective inlets 123a, 123b facing in opposite directions.

The wind funnel assemblies 120a, 120b are substantially identical to each other. As such, a first wind funnel assembly 120a includes an elongate funnel 122a, an upper scoop 126a, and a lower scoop 128a. Similarly, a second wind funnel assembly 120b includes an elongate funnel 122b, an upper scoop 126b, and a lower scoop 128b. The shape of the wind funnel assemblies 120a, 120b is substantially the same as that of the previously described wind funnel assembly 20.

The aligned disposition of the first and second wind funnel assemblies 120a, 120b can facilitate minimal readjustments to changing wind conditions and takes advantage of situations where wind blows from opposite sides. For example, if the first wind funnel assembly 120a is facing the incoming wind W, but the wind W suddenly changes direction to blow from the opposite direction, then the second wind funnel assembly 120b will already be facing in the correct direction to utilize the wind without requiring substantial reorientation. Thus, any downtime for power generation due to reorientation can be minimized.

The power generator assembly 140 is substantially similar to the previously described power generator assembly 40. In that regard, the power generator assembly 140 includes the housing 142, openings 145a, 145b on opposite sides of the housing 142 in communication with respective funnels 122a, 122b, a turbine 150, a pair of generators 160, and vents 146. The openings 145a, 145b are desirably of similar shape to the outlets 124a, 124b which, in turn, can be similar to the outlet 24 in FIG. 3, for example, on the respective funnels 122a, 122b. Unlike the embodiment of the horizontal ducted wind turbine 10, the housing 142 is mounted to a yoke 114, and the yoke 114 is pivotally coupled on top of a pole 112. Additionally, the vents 146 are formed on the bottom of the housing 142. The yoked mounting of the housing 142 suspends the housing 142 above the top of the pole 112 and provides substantially unobstructed space for exhausting the wind flowing through the housing 142.

Figure 6:
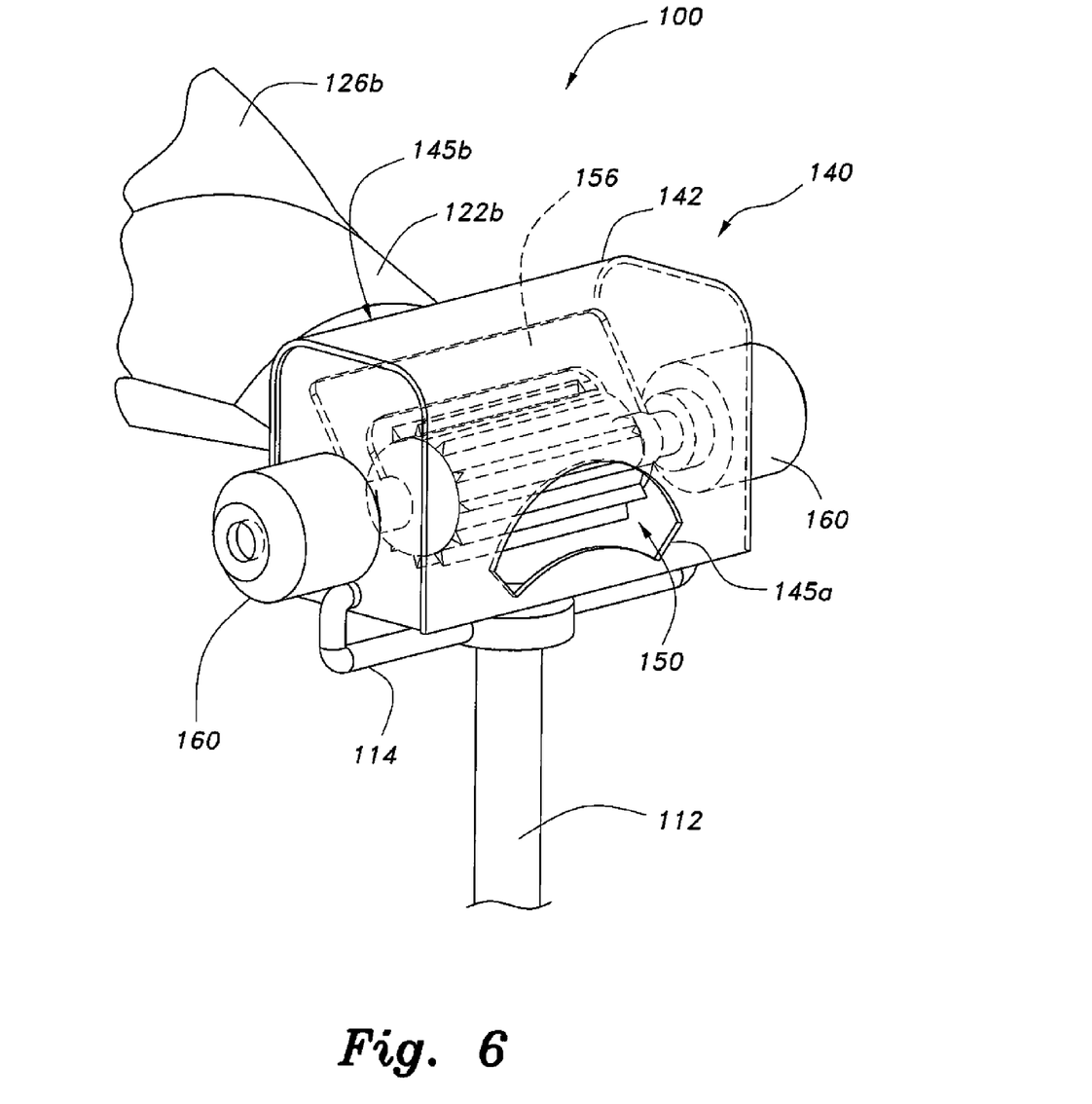
FIG. 6 is a perspective view of a generator housing for the horizontal ducted wind turbine shown in FIG. 5A with one of the funnels removed for clarity.
Figure 7:
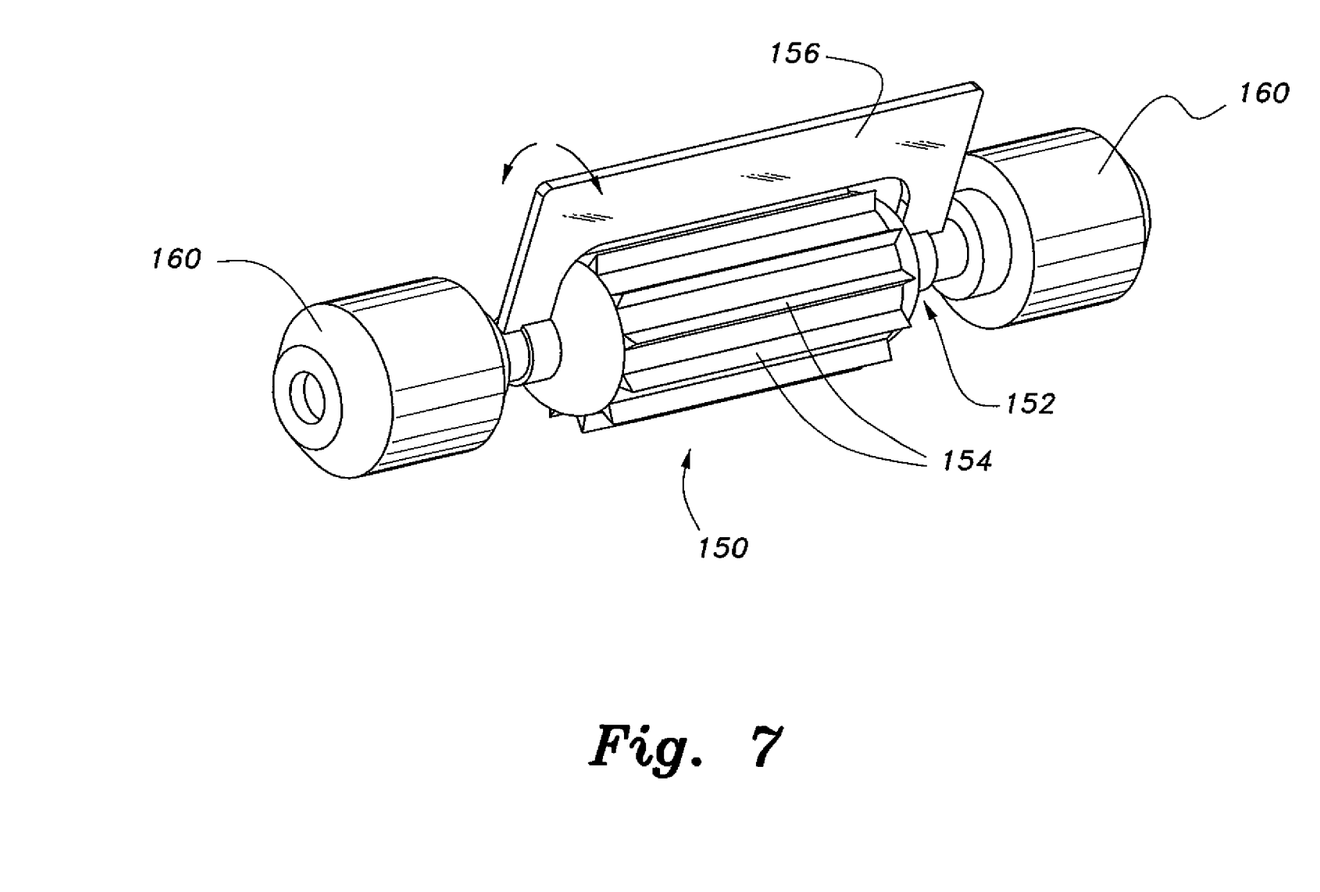
FIG. 7 is a perspective view of a power generator and a deflector in the horizontal ducted wind turbine shown in FIGS. 5A and 5B.

In this embodiment, the horizontal ducted wind turbine 100 is constructed so that one of the two funnels 122a, 122b facilitates power generation depending on the flow direction of incoming wind W. As best seen in FIGS. 6 and 7, the power generator assembly 140 includes a deflector 156 pivotally coupled to the shaft 152 of the turbine 150. The deflector 156 can be provided as a substantially U-shaped plate that, when assembled, extends substantially the whole length of the shaft 152 and straddles the blades 154 with space for a gap between the blades 154 and the deflector 156. The deflector 156 is desirably freely pivotable about the shaft 152, and the deflector 156 is sized to pivot within a limited arc inside the housing 142.

In use, when wind W flows through the funnel 122a, the incoming wind W pushes against the deflector 156 (if the deflector 156 is positioned adjacent the opening 145a) to forcibly pivot the deflector 156 towards the opposite side of the housing 142 until the deflector 156 abuts against an interior wall of the housing 142. At this point, the deflector 156 substantially covers the opposite opening 145b while simultaneously deflecting the incoming wind W towards the blades 154 to rotate the turbine 150 in one direction. As the wind W continues to flow around the turbine 150 within a relatively large arc to facilitate the rotation, the wind W escapes through the vents 146 towards the ground. If the wind direction changes such that the wind flow is from the opposite direction, similar operation occurs but in reverse. Thus, the wind W now flows through the funnel 122b forcing the deflector 156 to pivot towards the funnel 122a and the opposite opening 145a. Again the deflector 156 abuts against an interior wall of the housing 142 but opposite from the initial position to simultaneously substantially cover the opening 145a and deflect the incoming wind W towards the blades 154 to rotate the turbine 150 in, now, the opposite direction. As the wind W continues to flow around the turbine 150 within a relatively large arc to facilitate the rotation, the wind W escapes through the vents 146 towards the ground. Some bleeding of wind W towards the corresponding opposite opening 145a, 145b can occur during the above operation. However, the bleeding is typically negligible.

The horizontal ducted wind turbine 100 is therefore capable of substantially continuous operation during times of extreme changes in wind direction with relatively minimal disruption. Any disruption of operation due to wind direction changes between the extremes, i.e. opposite directions, is substantially compensated by a combined action of the non-active wind funnel assembly 120a or 120b and any residual wind flowing through the active wind funnel assembly 120a or 120b creating a relative high pressure zone inside the housing 142. The non-active wind funnel assembly 120a or 120b essentially functions similar to a rudder while the active wind funnel assembly 120a or 120b can act as having an effective greater mass due to the residual wind flowing therethrough and the pressure being exerted therein.

It is to be understood that the embodiments of the horizontal ducted wind turbine 10, 100 can include variants in various aspects. For example, the horizontal ducted wind turbine 10, 100 can be constructed from a variety of materials such as wood, plastic, metals, composites, combinations thereof, and the like. The materials being used should be durable so as to withstand the rigors of windy environments. Though the embodiments of the horizontal ducted wind turbines 10 and 100 have been described with self-adjusting features to passively reorient towards the incoming wind direction, the horizontal ducted wind turbines 10 and 100 can be provided with a mechanism that can automatically facilitate reorientation in an active manner. For example, such a mechanism can include components such as a wind direction sensor, a servo motor, and a processor that can process the data from the sensor and send commands to the servomotor to selectively adjust positioning of the horizontal ducted wind turbine.

It is to be understood that the present invention is not limited to the embodiments described above, but encompasses any and all embodiments within the scope of the following claims.

I claim:

1. A horizontal ducted wind turbine, comprising:
at least one power generator assembly adapted to be rotatably coupled to an elongate pole, the at least one power generator assembly having:
a housing, the housing having a front, a back, opposing sides, a bottom, a hollow interior, and one or more vents for exhausting incoming wind;
at least one turbine rotatably mounted inside the housing, wherein the at least one turbine comprises an elongate shaft and a plurality of blades radially extending from the shaft;
at least one generator operatively coupled to the at least one turbine, the at least one generator converting rotation of the at least one turbine into energy; and
at least one wind funnel assembly extending from the housing, the at least one wind funnel assembly having an elongate, curvilinear-shaped funnel, the funnel having a relatively large and wide inlet at one end to permit entrance of incoming wind and a relatively small and narrow outlet at the opposite end, the outlet being in communication with the housing, wherein the curvilinear-shape of the funnel comprises a substantially arcuate segment of a hollow, annular frustocone; further wherein the funnel comprises an upper scoop extending outwardly from a top portion of the inlet at a first divergent angle and a lower scoop extending outwardly from a bottom portion of the inlet at a second divergent angle, the upper scoop and the lower scoop enhancing capture of incoming wind towards the inlet;
wherein the funnel directs incoming wind flowing through the inlet towards the outlet to rotate the at least one turbine in order to facilitate production of the energy by the at least one generator.

2. The horizontal ducted wind turbine according to claim 1, wherein the at least one generator comprises a pair of generators, each respectively extending from a corresponding side of the housing.

3. The horizontal ducted wind turbine according to claim 1, wherein the upper scoop comprises a curved, duck bill-shaped panel.

4. The horizontal ducted wind turbine according to claim 1, wherein the lower scoop comprises a notched, curvilinear duck bill-shaped panel.

5. The horizontal ducted wind turbine according to claim 1, further comprising:
at least a pair of wings extending from opposing sides of the funnel in a swept wing configuration, the wings substantially stabilizing positioning of the funnel within a wind stream and self-orienting the funnel in response to changes in wind direction in the wind stream in order to position the funnel towards a changed wind direction.

6. The horizontal ducted wind turbine according to claim 5, wherein each wing comprises a substantially triangular section extending from the inlet towards the outlet and a substantially partial frustoconical section contiguous with the substantially triangular section and extending outwardly therefrom.

7. The horizontal ducted wind turbine according to claim 6, wherein each wing further comprises a conical wingtip extending outwardly at a divergent angle, the conical wingtip initiating steering of the funnel towards the wind during a change in the wind direction.

8. The horizontal ducted wind turbine according to claim 5, wherein the back of the housing comprises an upper half section and a lower half section, the one or more vents being formed on the lower half section to direct exhaust of incoming wind towards the ground.

9. The horizontal ducted wind turbine according to claim 1, further comprising:
a yoke coupled to the housing and adapted to be pivotally mounted to the pole, the yoke suspending the housing above the pole.

10. The horizontal ducted wind turbine according to claim 9, wherein the one or more vents are formed on the bottom of the housing to direct exhaust of incoming wind towards the ground.

11. The horizontal ducted wind turbine according to claim 10, wherein the at least one wind funnel assembly comprises a pair of wind funnel assemblies, one of the pair of wind funnel assemblies extending from the front of the housing, the other of the pair of wind funnel assemblies extending from the back of the housing in a substantially aligned, mirror-opposite relationship with the one of the pair of wind funnel assemblies such that each inlet of a respective funnel faces an opposite direction from the other, the housing having a corresponding opening in communication with the outlet of each funnel.

12. The horizontal ducted wind turbine according to claim 11, further comprising:
at least one elongate, substantially U-shaped deflector pivotally coupled to a shaft of the at least one turbine and straddling one or more blades thereon, the at least one deflector being pivotable by wind blowing through one of the openings in the housing in communication with a corresponding outlet of one of the funnels to thereby substantially cover the other opening and deflect the wind towards the one or more blades of the at least one turbine.

13. The horizontal ducted wind turbine according to claim 1, further comprising:
at least one mounting boss extending from the housing to selectively mount the at least one wind funnel assembly, the at least one mounting boss having an opening communicating with the interior of the housing and the outlet of the funnel.

14. A horizontal ducted wind turbine, comprising:
a housing adapted for mounting on a pole and freely rotatable thereon, the housing having vents to exhaust wind flowing through the housing;
a turbine rotatably mounted inside the housing;

a pair of generators coupled to the turbine, the generators producing energy from rotation of the turbine, each generator extending from a side of the housing; and at least one wind funnel assembly extending from the housing, the at least one wind funnel assembly having an elongate, curvilinear-shaped funnel, the funnel having a relatively large and wide inlet at one end to permit entrance of incoming wind and a relatively small and narrow outlet at the opposite end, the outlet being in communication with the housing, wherein the curvilinear-shape of the funnel comprises a substantially arcuate segment of a hollow, annular frustocone, the funnel having an upper scoop extending outwardly from a top portion of the inlet at a first divergent angle and a lower scoop extending outwardly from a bottom portion of the inlet at a second divergent angle, the upper scoop and the lower scoop maximizing capture of incoming wind towards the inlet, wherein the funnel directs incoming wind flowing through the inlet towards the outlet to passively compress the incoming wind and maximize wind velocity out of the outlet, the wind rotating the turbine to facilitate production of energy by the generators.

15. The horizontal ducted wind turbine according to claim 14, further comprising:

at least a pair of wings extending from opposing sides of the funnel in a swept wing configuration, the wings stabilizing positioning of the funnel within a wind stream and self-orienting the funnel in response to changes in wind direction in order to steer the funnel towards the changed wind direction.

16. The horizontal ducted wind turbine according to claim 14, wherein the at least one wind funnel assembly comprises a pair of wind funnel assemblies, one of the pair of wind funnel assemblies extending from a side of the housing, the other of the pair of wind funnel assemblies extending from an opposite side of the housing in a substantially aligned, mirror-opposite relationship with the one of the pair of wind funnel assemblies such that each inlet of a respective funnel faces an opposite direction from the other funnel, the housing having a corresponding opening in communication with the outlet of each funnel.

17. A horizontal ducted wind turbine, comprising:

a housing adapted for mounting on a pole and freely rotatable thereon, the housing having vents to exhaust wind flowing through the housing;

a turbine rotatably mounted inside the housing;

a pair of generators coupled to the turbine, the generators producing energy from rotation of the turbine, each generator extending from a side of the housing; and at least one wind funnel assembly extending from the housing, the at least one wind funnel assembly having an elongate, curvilinear-shaped funnel, the funnel having a relatively large and wide inlet at one end to permit entrance of incoming wind and a relatively small and narrow outlet at the opposite end, the outlet being in communication with the housing, wherein the at least one wind funnel assembly comprises a pair of wind funnel assemblies, one of the pair of wind funnel assemblies extending from a side of the housing, the other of the pair of wind funnel assemblies extending from an opposite side of the housing in a substantially aligned, mirror-opposite relationship with the one of the pair of wind funnel assemblies such that each inlet of a respective funnel faces an opposite direction from the other funnel, the housing having a corresponding opening in communication with the outlet of each funnel, wherein the funnel directs incoming wind flowing through the inlet towards the outlet to passively compress the incoming wind and maximize wind velocity out of the outlet, the wind rotating the turbine to facilitate production of energy by the generators.

\* \* \* \* \*